United States Patent [19]

Dickerson et al.

[11] 4,232,880
[45] Nov. 11, 1980

[54] ADJUSTING SLEEVE FOR A WHEEL ASSEMBLY

[75] Inventors: Carroll D. Dickerson, New Hudson; Robert W. Stevens, Garden City, both of Mich.

[73] Assignee: Ford Motor Company, Dearborn, Mich.

[21] Appl. No.: 28,624

[22] Filed: Apr. 9, 1979

[51] Int. Cl.³ .............................................. B62D 17/00
[52] U.S. Cl. .................................. 280/661; 403/161; 403/DIG. 8
[58] Field of Search ................... 280/661, 96.1, 95 R; 403/161, 162, 4, DIG. 7, DIG. 8

[56] References Cited

U.S. PATENT DOCUMENTS

| | | | |
|---|---|---|---|
| 2,405,458 | 8/1946 | Slack et al. | 280/661 |
| 2,544,331 | 3/1951 | Kogstrom | 280/661 |
| 2,900,196 | 8/1959 | Nienke | 280/96.1 |
| 2,923,555 | 2/1960 | Kost et al. | 280/661 |
| 3,563,564 | 2/1971 | Bartowiak | 280/96.1 |
| 3,880,444 | 4/1975 | Bridges | 280/661 |
| 3,887,211 | 6/1975 | Mazur | 280/95 R |
| 4,026,578 | 5/1977 | Mattson | 280/661 |

*Primary Examiner*—Robert R. Song
*Attorney, Agent, or Firm*—Steven L. Permut; Clifford L. Sadler

[57] ABSTRACT

A wheel assembly having an axle with two vertically spaced control arms pivotably mounted to two staggered arms of a spindle assembly. One arm of the spindle has an aperture receiving a rotatably mounted sleeve. The sleeve has an aperture therethrough which is eccentric with respect to the central axis of the sleeve. The eccentric aperture is constructed to receive a tapered ball stud integral with the ball mounted within a control arm. The ball stud extends through the aperture with a fastener threaded thereon to abut the sleeve and to draw a tapered section of the stud into the tapered aperture to expand the sleeve and to frictionally lock the sleeve within the aperture of the spindle. The sleeve when unlocked can be rotated to adjust the camber of the wheel assembly.

2 Claims, 5 Drawing Figures

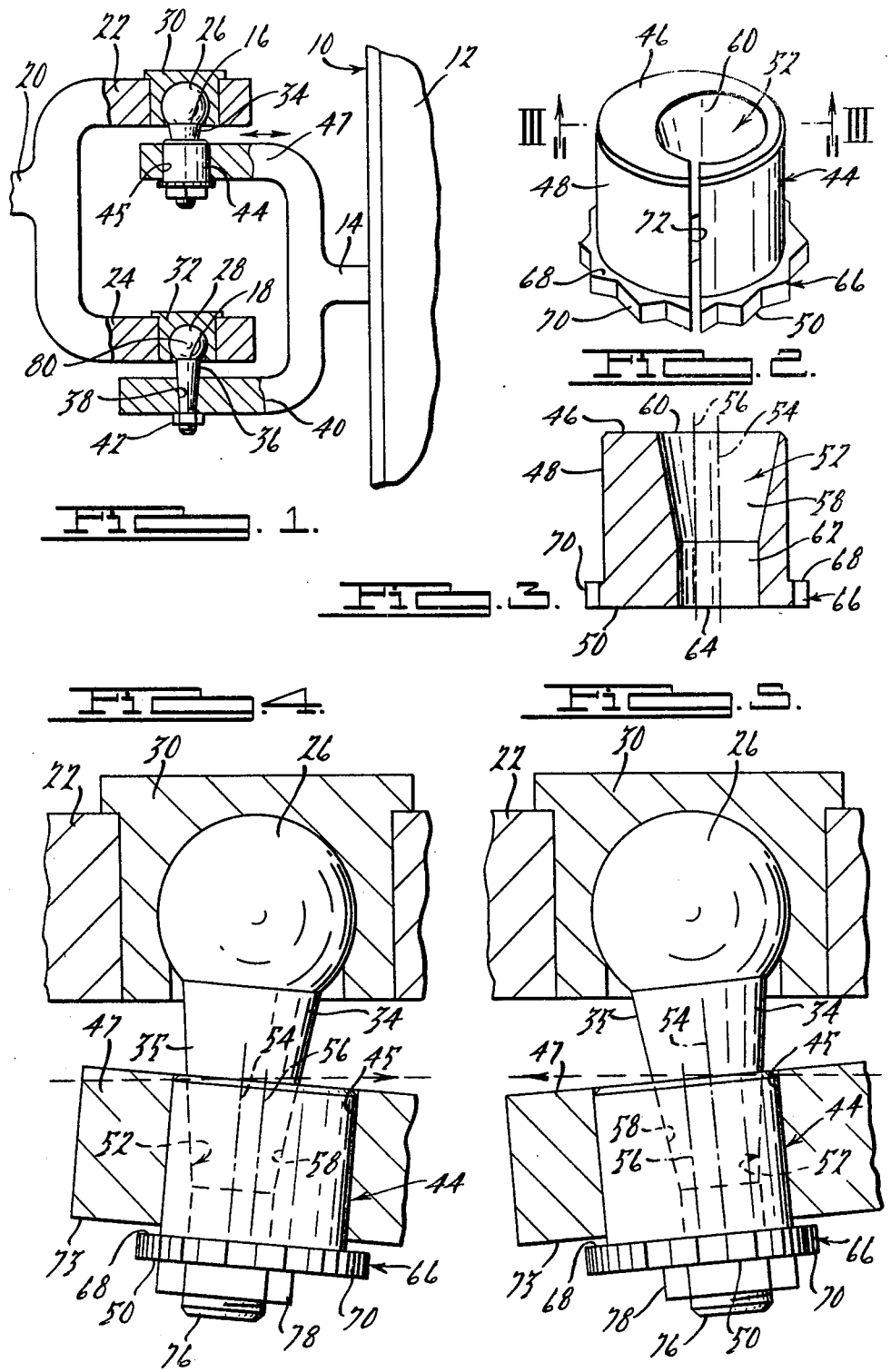

ADJUSTING SLEEVE FOR A WHEEL ASSEMBLY

BACKGROUND OF THE INVENTION

1. Field of the Invention

This invention relates to a one-piece adjusting sleeve and more particularly for an adjusting sleeve to adjust the camber and castor or pneumatic trail of a steerable wheel assembly.

2. Description of the Prior Art

Ball joints have long been used in automobiles to provide for rotatable motion between two connecting members. Often axial or lateral adjustments are needed between the two members to provide for the proper positioning thereof. One of the more common ways of providing this adjustment is to provide an eccentric member which when rotated provides the needed adjustment. Often, the ball joint has an eccentric stud integral with the ball which when rotated, moves the eccentric stud to the desired position. U.S. Pat. No. 3,880,444 issued to Bridges on Apr. 29, 1975 and U.S. Pat. No. 3,887,211 issued to Mazur on June 3, 1975 disclose the use of eccentric studs for adjusting steering linkage. U.S. Pat. No. 2,405,458 issued to Slack et al on Aug. 6, 1946 discloses the use of an eccentric displaced stud for adjusting the castor and camber of the steerable wheel assembly.

In addition, another common way is to provide a sleeve with an eccentrically displaced hole therethrough which when rotated provides the proper adjustment. U.S. Pat. No. 3,563,564 issued to Bartkowiak on Feb. 16, 1971 discloses such a sleeve which has a cylindrical stud therein and a spindle provided with a tapered aperture therethrough. U.S. Pat. No. 4,026,578 issued to Mattson on May 31, 1977 discloses such a sleeve with an eccentrically displaced hole for adjusting a McPherson strut assembly.

SUMMARY OF THE DISCLOSURE

According to the invention, a one-piece sleeve with a predetermined diameter is constructed to adjust the camber, castor or pneumatic trail of the wheel assembly. The wheel assembly is mounted onto a spindle. The spindle has vertically spaced upward and lower arms. The spindle arms are rotatably mounted respectively to an upper and lower control arm. The one-piece sleeve is mounted in one of the upper and lower spindle arms. Ball joints are mounted to the upper and lower control arms. One of the ball joints has a stud passing through an aperture through one of the arms in said spindle and is rigidly secured thereto. The sleeve is mounted to the other spindle arm.

The sleeve has an outer cylindrical surface with an aperture therethrough tapered from a top flat end of the sleeve to a bottom flat end of said sleeve.

The tapered aperture is adapted to receive a tapered ball stud extending from said second ball joint.

The sleeve has a slot axially extending therethrough which accommodates manufacturing tolerances and facilitates expansion of the sleeve when the ball stud is pressed within the said tapered aperture to expand the outer surface of said sleeve and frictionally lock the outer surface against the surface of the cylindrical aperture through the spindle arm to which the sleeve is mounted. In this fashion, the stud extending through the sleeve is rigidly secured to said spindle.

In one embodiment, the sleeve has a collar radially extending outward from said outer surface and adjacent said one axial end of said sleeve. The slot extends through said collar. The collar has a serpentine outer wall which facilitates manual grasping and rotating of said sleeve to adjust said camber and castor of said wheel assembly.

BRIEF DESCRIPTION OF THE DRAWINGS

Reference now will be made to the following drawings in which

FIG. 1 is a side elevational and partially segmented view showing one embodiment of the invention in the preferred setting.

FIG. 2 is a perspective view of the sleeve shown in FIG. 1.

FIG. 3 is a cross-sectional view taken along the lines 3—3 in FIG. 2.

FIG. 4 is a side elevational enlarged and segmented view showing the disclosed embodiment adjusting the spindle to a positive camber.

FIG. 5 is a view similar to FIG. 4 showing the sleeve adjusting the spindle to a negative camber.

DETAILED DESCRIPTION OF THE PRESENTLY PREFERRED EMBODIMENT

Referring now to FIG. 1, the wheel assembly 10 has a wheel 12 mounted to a spindle 14 which is mounted to ball joints 16 and 18 to an axle 20. The axle 20 has an upper control arm 22 and a lower control arm 24. The upper and lower control arms 22 and 24 are integrally formed with the axle 20.

Each ball joint 16 and 18 has a ball 26 and 28 mounted within sockets 30 and 32 respectively. Each ball 26 and 28 has an integrally formed stud portion 34 and 36 respectively. Stud 36 extends through a tapered aperture 38 in lower arm 40 of spindle 14. Fastener 42 threadably fastened onto threaded cylindrical end 37 of stud 36 to fix stud 36 with respect to lower arm 40.

Upper stud 34 extends through a sleeve which is mounted within aperture 45 in upper arm 47 of spindle 14. As more clearly shown in FIGS. 2 and 3, the sleeve 44 has a planar end 46, a cylindrical outer surface 48, and a flat bottom surface 50.

Aperture 52 extends from the planar upper end 46 to the bottom surface 50 with its central axis 54 parallel and spaced apart from central axis 56 of outer surface 48. The aperture 52 has a tapered section 58 from its top opening 60 in end 46 to a cylindrical section 62 which extends to opening 64 and surface 50. Collar 66 radially extends outwardly from cylindrical surface 48 near bottom surface 50. The collar 66 forms a shoulder 68 which has its plane substantially perpendicular to the cylindrical outer surface 48. In addition, the flange has a serpentine outer wall 70 which provides for manual grasping of said sleeve.

An axially extending slot 72 extends from the upper end 46 to the cylindrical portion and through the flange 66 to bottom surface 50. The slot extends from the outer surface 48 to the aperture 52.

Referring now to FIGS. 4 and 5, the sleeve 44 is mounted within an aperture 45 through the upper arm 47 such that a slight gap exists between shoulder 68 and lower surface 73 of spindle arm 47. Ball stud 34 has a tapered section 35 abut the tapered section 58 of aperture 52 and threaded cylindrical section 76 extends through the cylindrical portion 62 of aperture 52 and beyond bottom surface 50. Nut 78 is threaded onto section 76 and tightened to abut end 50 in a flush manner such that tapered section 58 receives said tapered section 35 of said ball stud 34. Sleeve 44 can slide up or down within aperture 45 to accommodate for hearing distance as the sleeve is from the ball joint 16. Tightening of nut 78 draws in tapered section 50 to expand the sleeve and to force the outer surface 48 to frictionally lock with respect to spindle arm 47 in aperture 46 and to lock stud 34 within an aperture 52 of said sleeve 44 to rigidly secure the stud with respect to spindle arm 47.

When the spindle arm 47 is positioned outwardly (to the right as viewed in FIG. 4) to provide a positive camber, spindle arm 47 undergoes a slight inclination with respect to the horizontal due to the fact of rotation about a ball center 80 of the lower ball 28 as shown in FIG. 1. The ball stud 34 is angled away from the direction of displacement of upper arm 47 with sleeve 44 rotated to have opening 60 essentially displaced inwardly with respect to the central axis 56 of sleeve 44.

Referring now to FIG. 5, when the spindle is adjusted to have a negative camber, sleeve 44 is rotated 180° to have axis 54 of aperture 52 inwardly displaced from axis 56 at opening 60. The spindle arm is slightly inclined at an opposing angle from FIG. 4. In addition, the aperture 45 is moved toward the right. Ball stud 34 is angled outwardly.

When the sleeve is rotated to a desired position, the fastener 78 is fastened onto the cylindrical threaded portion of 76 to abut surface 50, drawing tapered section 35 into the tapered section 58 of aperture 52 to expand sleeve 44 and frictionally lock the outer surface 48 with respect to the aperture 45.

In this fashion, a rotatable sleeve within an eccentric holder therethrough is provided which allows for adjustment of a spindle and for rigidly fixing the spindle with respect to an axle control arm after adjustment is made.

Variations and modifications of the invention can be made without departing from its spirit and scope which are defined in the appended claims.

The embodiments of the invention in which an exclusive property or privilege is claimed are defined as follows:

1. A vehicle wheel mounting assembly comprising;
an axle with lower and upper vertically spaced control arms;
a spindle mounting a wheel assembly;
said spindle having a lower and upper arm vertically spaced and pivotably connected to said lower and upper control arms;
a first ball joint mounted in said upper control arm;
a second ball joint mounted in said lower control arm;
a stud portion of one of said ball joints passing through an aperture in one of said arms of said spindle and rigidly secured thereto;
a sleeve mounted in a cylindrical aperture in the other of said arms of said spindle;
said sleeve having a substantially cylindrical outer surface adapted to rotate about in said cylindrical aperture of said spindle;
said sleeve having an axially extending eccentric hole therethrough which has an axis parallel and offset with respect to the axis of the cylindrical outer surface;
said hole having a tapered section away from said second ball joint to receive a tapered section of a ball stud of said second ball joint;
said sleeve having an outer integral collar adjacent one end and radially extending outward beyond said cylindrical outer surface forming a shoulder which is axially spaced from said spindle arm;
said sleeve having a slot axially extending from the top to the bottom of said sleeve and radially extending from said eccentric hole to said outer surface and through said outer collar allowing radial expansion of said sleeve when said tapered stud is pressed therein to press fit and frictionally lock said outer surface against a side of said cylindrical aperture in said spindle and said stud against sides of said hole in said sleeve to rigidly secure said stud to said spindle arm at a desired position.

2. A vehicle wheel mounting assembly as defined in claim 1 wherein said collar has a serpentine outer wall to facilitate manual grasping and rotating of said sleeve.

* * * * *